United States Patent
Li (10) Patent No.: US 9,817,746 B2
(45) Date of Patent: Nov. 14, 2017

(54) TESTING IMPLEMENTATION PARAMETERS OF A COMPUTER PROGRAM IN A DISTRIBUTED ENVIRONMENT

(71) Applicant: FUJITSU LIMITED, Kawasaki-shi, Kanagawa (JP)

(72) Inventor: Michael Li, Hayes Middlesex (GB)

(73) Assignee: FUJITSU LIMITED, Kawasaki (JP)

( * ) Notice: Subject to any disclaimer, the term of this patent is extended or adjusted under 35 U.S.C. 154(b) by 235 days.

(21) Appl. No.: 14/796,231

(22) Filed: Jul. 10, 2015

(65) Prior Publication Data

US 2015/0317240 A1  Nov. 5, 2015

Related U.S. Application Data

(63) Continuation of application No. PCT/EP2014/050173, filed on Jan. 7, 2014.

(30) Foreign Application Priority Data

Jan. 11, 2013 (EP) ...................................... 13151060

(51) Int. Cl.
*G06F 11/00* (2006.01)
*G06F 11/36* (2006.01)
*G06F 9/45* (2006.01)

(52) U.S. Cl.
CPC .......... *G06F 11/3664* (2013.01); *G06F 8/443* (2013.01); *G06F 11/3612* (2013.01); *G06F 11/3616* (2013.01)

(58) Field of Classification Search
CPC ............. G06F 11/3612; G06F 11/3616; G06F 11/3664; G06F 11/0757; G06F 11/3409; G06F 11/3672; G06F 11/3688; G06F 11/3692; G06F 11/3676; G06F 8/443

See application file for complete search history.

(56) References Cited

U.S. PATENT DOCUMENTS

| 6,026,444 A | 2/2000 | Quattromani et al. |
| 8,914,673 B2* | 12/2014 | Hachmeister ....... G06F 11/3672 714/25 |
| 9,189,374 B2* | 11/2015 | Zhang ................. G06F 11/3688 |
| 2007/0061784 A1* | 3/2007 | Prakash .............. G06F 11/3433 717/127 |

(Continued)

OTHER PUBLICATIONS

Extended European Search Report dated Mar. 25, 2013 in corresponding European Patent Application No. 13151060.4.

(Continued)

*Primary Examiner* — Marc Duncan
(74) *Attorney, Agent, or Firm* — Staas & Halsey LLP (57) ABSTRACT

A method of testing implementation parameters of a computer program in a distributed environment, the method comprising; testing of alternative implementation parameters in parallel in the distributed environment, and providing a time-out mechanism that aborts testing processes when one of the following abort conditions is satisfied: a time allowed for testing has expired; and testing processes for a predefined number of alternative implementations are complete; wherein the time-out mechanism includes a hardware interface, which is arranged to cause a hardware supported abort.

13 Claims, 6 Drawing Sheets

(56) References Cited

U.S. PATENT DOCUMENTS

| | | | |
|---|---|---|---|
| 2007/0061785 A1* | 3/2007 | Prakash | G06F 8/70 717/127 |
| 2007/0132477 A1* | 6/2007 | Balog | G01R 31/2894 324/762.01 |
| 2007/0294663 A1 | 12/2007 | McGuire et al. | |
| 2007/0294682 A1 | 12/2007 | Demetriou et al. | |
| 2010/0180255 A1 | 7/2010 | Chung et al. | |
| 2011/0010715 A1 | 1/2011 | Papakipos et al. | |
| 2011/0099424 A1* | 4/2011 | Rivera Trevino | G06F 11/263 714/25 |
| 2012/0131313 A1 | 5/2012 | Ozer et al. | |

OTHER PUBLICATIONS

PCT International Search Report dated Mar. 6, 2014 in corresponding International Patent Application No. PCT/EP2014/050173.
Jones, "15: POSIX Threads (pthreads) Programming", GNU/Linux Application Programming, Second Edition, Apr. 2008, p. 253-275.
Ajima et al., "Tofu: Interconnect for the K computer", Fujitsu Sci. Tech. J., vol. 48, No. 3, Jul. 2012, pp. 280-285.

* cited by examiner

TESTING IMPLEMENTATION PARAMETERS OF A COMPUTER PROGRAM IN A DISTRIBUTED ENVIRONMENT

CROSS-REFERENCE TO RELATED APPLICATIONS

This application is a continuation of International Application No. PCT/EP2014/050173, filed Jan. 7, 2014, which claims the benefit of European Application No. 13151060.4, filed Jan. 11, 2013, in the European Intellectual Property Office, the disclosure of which is incorporated herein by reference.

BACKGROUND

1. Field

The present invention relates to high performance computing (HPC) including programming models, distributed computing, inter-node communication and high performance CPU (central processing unit) instruction set extensions.

2. Description of the Related Art

Increasingly, software is tested and/or improved automatically using various techniques such as auto-tuning. Auto-tuning can automatically enhance the software, to make it perform better. For example, an auto-tuning phase of an application can analyze functionally equivalent implementations to identify the one that best meets the user's objectives. In the overlapping concept of optimization, an objective function related to an operating parameter (such as energy use, time taken for processing, or number of floating point operations per second) is maximized or minimized appropriately. If the objective function measures the performance of a program, then optimizing the objective function "tunes" the program. Equally there may be a search phase to find an item with specified properties among a collection of items. The search may identify possible implementations/executions, or remove less advantageous implementations. If the item found optimizes an objective function, then the search performed can be viewed as an optimization.

Any of these testing techniques may be used during an execution stage or in any other stage of software development and use.

Automatic software testing is of particular value in distributed environments. In such environments, there is a plurality of processing elements or cores on which processing threads of an executable can run autonomously in parallel. The term "processing element" or "core" may be thought of as hardware resources necessary for executing program code instructions.

In parallel distributed systems, there is the possibility of preparing and selecting distributed algorithms (which implement code using a parallelization strategy) and/or, at a lower level, kernels (compiled software code that can be executed on a node of a parallel computing system). It is desirable to provide testing (for example in the form of auto-tuning, optimization and/or search) which is efficient and quick to cater for improved software performance in these and other use cases.

Many different hardware configurations and programming models are applicable to high performance computing. A popular approach to high-performance computing currently is the cluster system, in which a plurality of nodes each having a multicore processor (or "chip") are interconnected by a high-speed network. The cluster system can be programmed by a human programmer who writes source code, making use of existing code libraries to carry out generic functions. The source code is then compiled to lower-level executable code, for example code at the ISA (Instruction Set Architecture) level capable of being executed by processor types having a specific instruction set, or to assembly language dedicated to a specific processor. There is often a final stage of assembling or (in the case of a virtual machine, interpreting) the assembly code into executable machine code. The executable form of an application (sometimes simply referred to as an "executable") is run under supervision of an operating system (OS).

To assist understanding of the invention to be described, some relevant techniques in the field will be outlined.

Applications for computer systems having multiple cores may be written in a conventional computer language (such as C/C++ or Fortran), augmented by libraries for allowing the programmer to take advantage of the parallel processing abilities of the multiple cores. In this regard, it is usual to refer to "processes" being run on the cores.

One such library is the Message Passing Interface, MPI, which uses a distributed-memory model (each process being assumed to have its own area of memory), and facilitates communication among the processes. MPI allows groups of processes to be defined and distinguished, and includes routines for so-called "barrier synchronization", which is an important feature for allowing multiple processes or processing elements to work together. Barrier synchronization is a technique of holding up all the processes in a synchronization group executing a program until every process has reached the same point in the program. This is achieved by an MPI function call which has to be called by all members of the group before the execution can proceed further.

As already mentioned, MPI uses a distributed memory model in which each task has its own local memory. Another approach to parallel programming is shared-memory, where multiple processes or cores can access the same memory or area of memory in order to execute instructions in multiple, concurrent execution paths or "threads". OpenMP is such a shared-memory processing model.

A synchronization group may be constituted by all the cores of a multicore processor. Then, barrier synchronization is also possible in hardware form, such as by an on-chip logic circuit receiving outputs from the plurality of cores. This gives the advantage of higher speed in comparison with a software-based barrier.

OpenMP provides a so-called "fork-and-join" model, in which a program begins execution as a single process or thread (Master Thread). This thread executes instructions sequentially until a parallelization directive is encountered, at which point the Master Thread divides into a group of parallel Worker Threads in a Parallel region of the program. Typically, each thread is carried out by a respective core, although this is not essential. The worker threads execute instructions in parallel until they reach the end of the Parallel region. After synchronization (see above) the worker threads combine again back to a single Master Thread, which continues sequential instruction execution until the next parallelization directive is reached.

SUMMARY

Additional aspects and/or advantages will be set forth in part in the description which follows and, in part, will be apparent from the description, or may be learned by practice of the invention.

According to one aspect of the invention, embodiments provide a method of testing implementation parameters of a computer program in a distributed environment, the method comprising; testing of alternative implementation parameters in parallel in the distributed environment, and providing a time-out mechanism that aborts testing processes when one or more of the following abort conditions is satisfied: a time allowed for testing has expired; and testing processes for a predefined amount of alternative implementations are complete; wherein the time out mechanism includes a hardware interface, which is arranged to cause a hardware supported abort.

This embodiment of the invention has the advantage that it can check for two different abort conditions and thus abort testing under two different circumstances. The abort will take place once a time allowed for testing has expired. Additionally the abort will take place when testing of a predefined amount, e.g. percentage of alternative implementations is complete. The predefined percentage of alternative implementations may be set as a number. Thus if only the quickest option (alternative implementation) is desired, the predefined number of alternative implementations may be one so that one completion only is regarded as sufficient/early completion. Alternatively, the predefined percentage may be set directly in percentage terms, for example as 5% to give one completion if there are 20 parallel testing processes taking place. Not only are slower processes aborted, but also any failed process (which will never successfully complete) can be effectively aborted using this methodology.

An important feature of this embodiment is the use of a hardware interface as part of the time-out mechanism. A hardware-supported abort can increase the efficiency of the testing method.

The hardware interface acts as a sort of "weak" barrier which, unlike known barrier synchronization, does not necessarily wait for full execution of each alternative implementation but aborts according to the conditions defined above.

The method of testing mentioned above may be any suitable form of testing, including auto-tuning, search, or optimization. Use herein of the term "implementation parameters" is intended to be interpreted broadly and encompass any value or choice taken in implementing and/or executing a computer program, including for example, the choice of distributed algorithms and computational kernels.

Subsequent steps in such methods can then be taken to improve the implementation parameters following the testing phase. For example, in an auto-tuning method, subsequent steps may include optimization.

Communication between the hardware interface and the testing under software control can take place in any convenient manner. In some embodiments, the time out mechanism also includes a software time out region which is executed in the distributed environment until an abort condition is satisfied, the executable calling the hardware interface when the abort condition is satisfied.

The software time-out region executable code is effectively a limit to the amount of testing, which can be written into the source code of the computer program. For example the software time-out region may be an application programming interface (API). Preferably, the software time-out region is designed to allow recovery after the testing processes have aborted, so that subsequent parallel testing processes can take place. For instance, the time-out region may register any memory allocated, for ease of deallocation when leaving the time-out region.

For example, the code may be outlined, with specific implementation and restriction requirements related to memory allocation and/or function calls within the outlined region. As used herein, the term "outlining" is the reverse of in-line expansion/in-lining. Outlining is a known technique from implementations of OpenMP. Essentially, when the time-out region is invoked, control is transferred to its definition by a branch or call instruction.

The software time-out region may return any values useful for the testing. In one embodiment, the software time-out region returns values for the minimum and or maximum completion time of all the parallel testing processes. The process(es) which achieve the minimum or maximum completion time may be identified using MPI.

The distributed environment can be any that includes a plurality of processing elements or cores. Preferably, the distributed environment includes a plurality of cores and the testing is carried out in parallel on the plurality of cores. In preferred embodiments, the cores are grouped together into nodes of the distributed environment.

There may be a single node with its group of cores and the time-out mechanism may apply to a single node only. Alternatively, the time-out mechanism can be applied separately to each of a plurality of nodes. The nodes may communicate, (for example interacting as nodes in a supercomputer) and the minimum and maximum completion time or other values may be used in inter-node comparison, if they are important.

In environments with a plurality of nodes, a separate hardware interface (as variously described above) may be included in each node of the distributed environment. Alternatively, a single hardware interface may be provided in component parts, one for each core.

Advantageously, when the executable calls the hardware interface, the time-out mechanism, for instance the hardware interface, removes instructions related to the time-out region from an instruction pipeline. Other instructions may be left unaffected, and the state of the node can thus be ready to continue computation after the time-out region.

Preferably, the time-out mechanism (for example the executable) sends a start instruction to mark the beginning of the time-out region and/or a time-out instruction to cause the abort. The instructions can be CPU instructions, such as reduced instruction set computer RISC instructions. They may be sent to a core on which testing is running.

In some circumstances, the time-out mechanism will abort the testing when all the alternative implementations have been processed. Thus abort can occur when a time allowed for the testing has not expired. For example a time-out of 30 minutes may be set, but all the options processed within 20 minutes.

In other circumstances, the time allowed for the testing may be designed to allow completion of processes corresponding to faster alternative implementation parameters only. That is, not all the testing processes complete. Some slower processes will not complete. Equally, any failed processes will not complete. Of course, in some areas it may be a requirement that all of the processes finish so that 100% completion is regarded as the predefined percentage of alternative implementations.

According to an embodiment of a further aspect of the invention there is provided an application programming interface API for testing implementation parameters of a computer program in a distributed environment, the API implementing a time-out mechanism aborting parallel testing of alternative implementation parameters in the distributed environment when one or more of the following abort conditions is satisfied:

a time allowed for testing has expired; and testing processes for a predefined amount of alternative implementations are complete, wherein the API initializes testing by calls to a hardware interface, which is arranged to cause a hardware supported abort.

According to an embodiment of still further aspect of the invention there is provided a controller of a node in a distributed environment of computing nodes, each node comprising a plurality of cores, the controller including: a hardware interface arranged for use in a method of testing implementation parameters of a computer program in the distributed environment, the method comprising parallel testing of alternative implementation parameters in the distributed environment, wherein the hardware interface is arranged to abort the testing when one or more of the following abort conditions is satisfied: a time allowed for testing has expired; and the testing processes for a predefined amount of alternative implementations are complete.

A distributed computing environment may be provided which comprises a plurality of nodes each including a controller as defined above.

The features and sub-features of any of the above aspects may be combined in any way.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION

Reference will now be made in detail to the embodiments, examples of which are illustrated in the accompanying drawings, wherein like reference numerals refer to the like elements throughout. The embodiments are described below to explain the present invention by referring to the figures.

Figure 1:
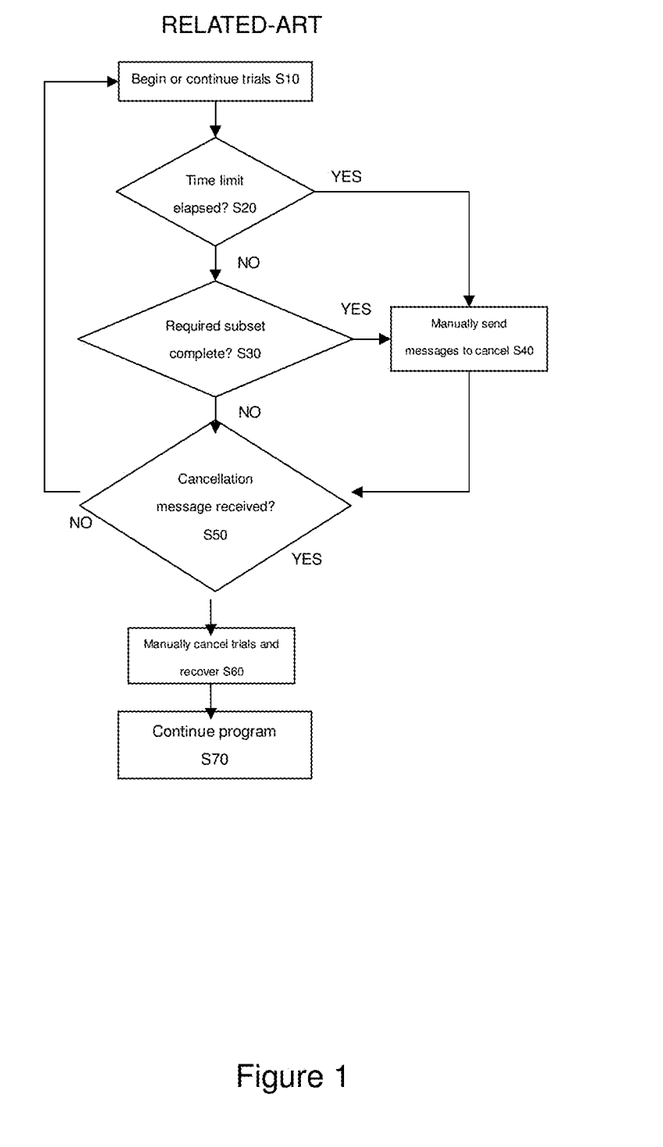
FIG. 1 is a flowchart showing a related art process in software testing.

FIG. 1 shows a software-based strategy for trials as used in the related art known to the inventor. At step S10 trials start or are continued. At step S20, it is decided whether a time-limit has expired. If so, messages are sent manually to cancel the trials in step S40. If not, it is determined in step S30 whether the required sub-set has been completed. After step S30 or S40 as the case may be, it is determined whether a cancellation message has been received in step S50. The cancellation message may be one node sending data to a second node so that a variable named "CancelTrials" is changed from 0 (false) to 1 (true).

If the cancellation message has been received the process continues with step S60. If not, trials are continued in step S10. In step S60 the trials are manually cancelled and there is a recovery. In step S70 the program is continued. The term "manually" here can mean applied by the application developer who may also be the end-of-user of the application. Decisions of the developer are implemented in the program (that is the application software).

Figure 2:
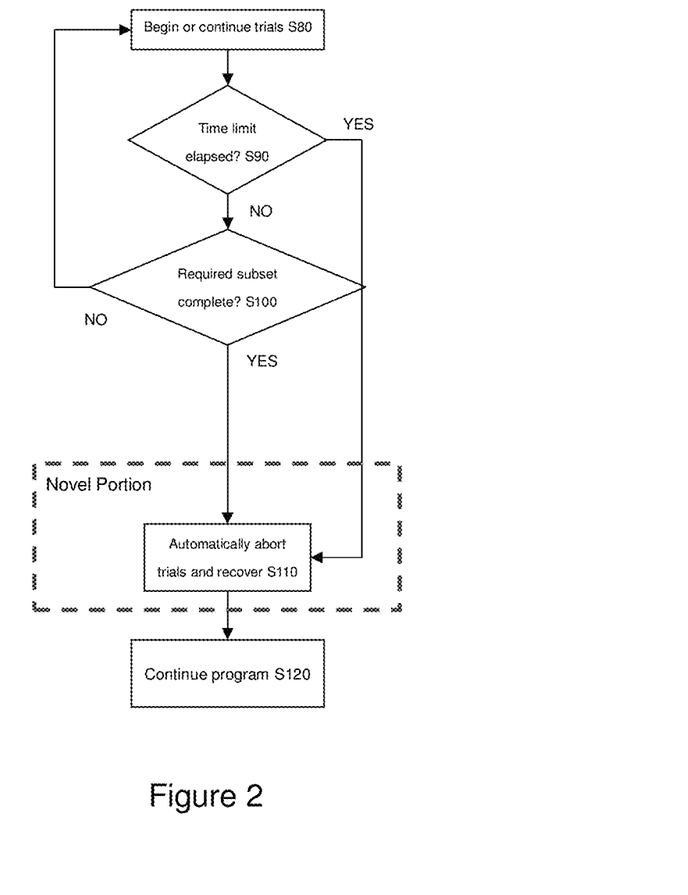
FIG. 2 is a flowchart showing a process of software testing according to an embodiment of the present invention.

FIG. 2 shows a similar flowchart illustrating the novel distributed hardware-assisted time-out apparatus and method of the present invention embodiments. The embodiments allow hardware-assisted abort of trials and recovery. The related art is not able to achieve the performance of these invention embodiments because slower software-based strategies are employed.

In FIG. 2, S80 is the beginning or continuation of trials. In step S90 it is determined whether a time-limit has elapsed. If so, the processor automatically aborts the trial and recovers in step S110. If not, it is determined whether the required sub-set has been completed in step S100. If the required sub-set is not complete, trials are continued in step S80. If the required sub-set is complete, there is an automatic abort of the trials and recovery in step S110. The program continues in step S120.

Another difference between the related art and this embodiment of the invention is that the related art requires manual messages sent for cancellation and manual cancellation of the trials. In contrast, in this invention embodiment the trials are automatically aborted.

Uses of Invention Embodiments

Invention embodiments can solve the problem of auto-tuning and other testing methods taking a long time on a distributed computer and on an isolated processing element. Prior art arrangements cannot solve this problem. In the prior art there is little flexibility in the preparation and selection of distributed algorithms and computational kernels. Lengthy empirical experiments may be required and such experiments may not optimize the time taken to perform methods such as auto-tuning, optimization or search.

Testing a Number of High-Level Distributed Parallel Algorithms

A number of different high-level distributed parallel algorithms may be empirically tested (perhaps arranged to run in parallel in a non-interfering manner) using the invention to find the algorithm with the highest performance. Benefits of using the invention include simplifying the source code implementation of the testing, and arriving at the final optimized algorithm efficiently using hardware support to reject inefficient algorithms quickly.

Testing a Number of Different Computational Kernels on One or More Computers and/or One or More Nodes of a Supercomputer A number of different computational kernels may be empirically tested (usually arranged to run in parallel in a non-interfering manner) using the invention to find the computational kernel with the highest performance. Benefits of using the invention include simplifying the empirical auto-tuning framework source code, and arriving at the final optimized kernel more quickly using hardware support to reject inefficient kernels quickly.

Carrying Out an Optimization Process

A parallel algorithm may carry out a branch and bound strategy using an invention embodiment. This strategy is a general algorithm for finding optimal solutions of various optimization problems consisting of a systematic enumeration of all candidate solutions. Sub-sets of fruitless candidates are discarded en masse by using upper and lower estimated bounds of the quantity being optimized.

Carrying Out a Search Process

A parallel algorithm may carry out a tree pruning search using an invention embodiment. The pruning technique reduces the size of a decision tree by removing sections of the tree that provide little assistance.

Acting as a Hardware-Assisted, Fault-Tolerant Weak Barrier

The invention embodiments allow the specification that only a subset of processes needs to complete for the computation to continue. This specification gives flexibility in the testing to avoid waiting for completion of processes which have suffered a fault and will either never reach the completion point of the barrier or will not reach that point in a reasonable time.

An Implementation Scenario

Figure 3:
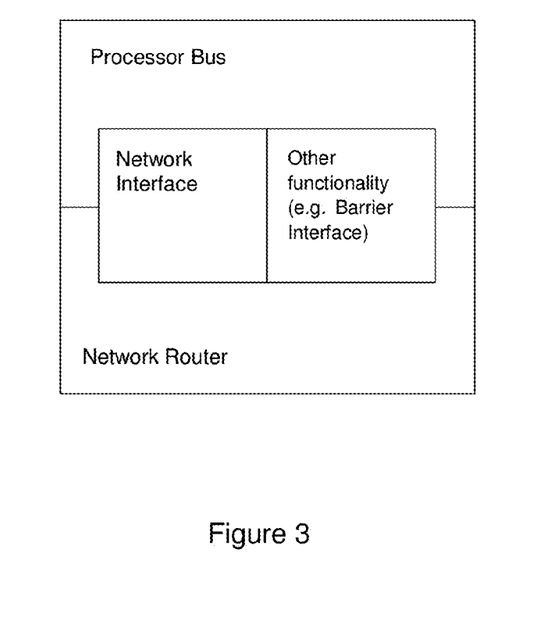
FIG. 3 is a diagram of components implementing an interconnect in a distributed environment (the network of either electrical or optical cables is not shown)

One advantageous implementation of the invention is in a supercomputer with many interconnected nodes, using a model such as a fat-tree or a torus topology model. The two basic types of components needed to implement an interconnect, allowing communication between nodes, are Network Router and Network Interface components. These are illustrated on a chip in FIG. 3 but their configuration varies greatly from example to example. Example interconnects include those used by the QCDOC (Quantum Chromodynamics on a Chip) and Gemini machines, and technologies developed by Fujitsu, Mellanox and Intel among others.

Figure 4:
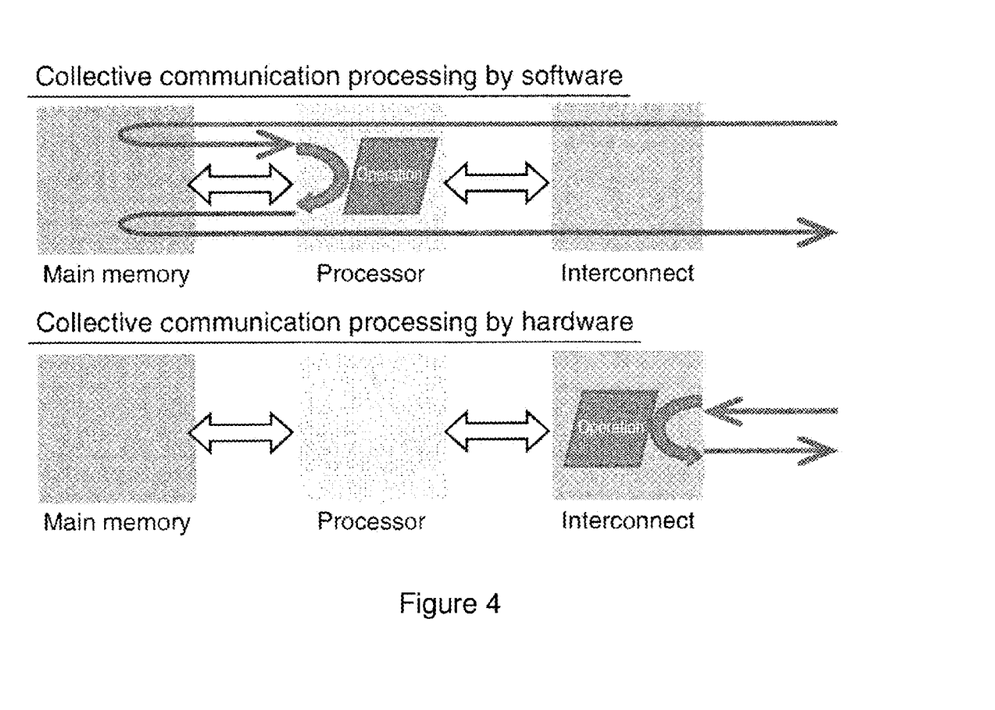
FIG. 4 is a schematic diagram illustrating the difference between collective communication processing by software and by hardware.

Additional functionalities may be provided by an interconnect, an example of which is a Barrier Interface (BI) for synchronization operations. FIG. 4 shows the difference between collective communication processing using software and hardware (BI). When collective communication is processed by software, both the received and transmitted data pass through the main memory, which causes high latency. Communication processing by the BI does not require main memory access and thus achieves low latency.

Collective communication processing by software is affected by OS jitter. OS jitter is fluctuation in processing between computation processes by parallel computation, which is caused by interruptions to computation processing due to process switching to a daemon process and such like. A typical interruption lasts several tens of microseconds to a few milliseconds but, in collective communication, many nodes wait for data and the delay in processing propagates to affect many nodes, which makes the drop in performance more serious. In contrast, collective communication processed by hardware has the advantage of being less susceptible to OS jitter.

Embodiments of this invention could potentially use an existing hardware barrier component such as a Barrier Interface additionally as the weak barrier mentioned above, which allows a subsequent testing process to start even if only a sub-set of the processors previously for testing have completed. More probably there will be a further component, a "Timeout Interface" (TI), acting as the weak barrier, which may be positioned next to the BI and may be aware of timeouts and sufficient completions.

Figure 5:
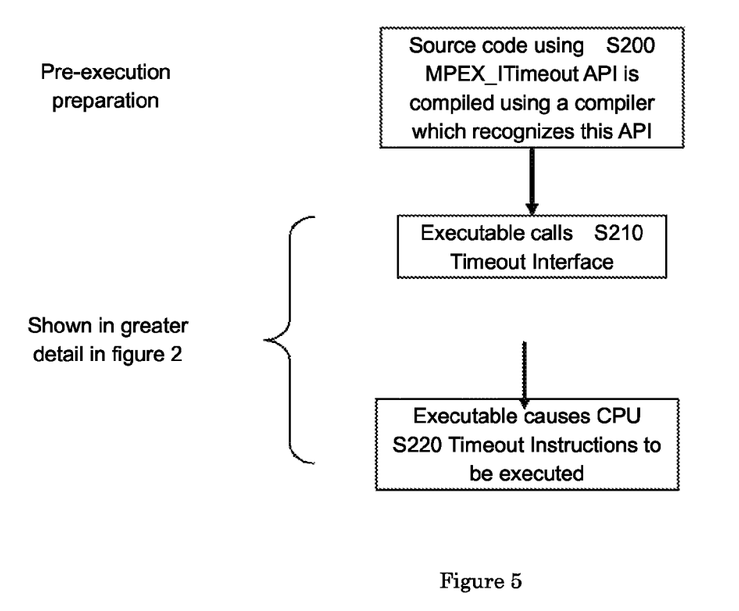
FIG. 5 is a flowchart illustrating main technical aspects of an invention embodiment.

FIG. 5 shows 3 main elements of this embodiment.
1. A C/C++ API (Application Programming Interface) referred to as "MPEX_ITimeout".
2. Communication hardware functionality.
3. Computer processor functionality and instructions.

In step S200 pre-execution preparation takes place. Source code using an appropriate API is compiled using a compiler which recognizes the API.

In step S210 the executable calls the weak barrier of the appropriate hardware, in this case of the interconnect controller.

In step S220 the executable causes instructions such as CPU Timeout instructions to be executed. The time-out code region may send a time-out duration for the whole region and/or the number of completions regarded as "early completion/sufficient completion" to the Timeout Interface. The Timeout Interface may send a notification to the processors that sufficient completion has occurred. Thus in some arrangements, the actual timing takes place at the processors so no timing is carried out by the Timeout Interface (TI). In other arrangements, timing can take place at the TI. This may enhance the "weak barrier functionality" with an additional feature.

The execution is shown in more detail in FIG. 2. That is, if either of the conditions in S90 or S100 is satisfied, then there is an automatic abort.

The time-out region may be written into the source code in any suitable way, for example using conventional programming languages and integrated function calls. It may be in the form of an MPI or OpenMP code. Code illustrations are set out below.

A C/C++ API may include the functions:

```
MPEX_ITimeout(double duration, double *min_max_time,
MPI_Op min_max, int num_early_completion
MPI_Comm comm, MPI_Request *request)
/* Timeout Region. */
MPEX_ITimeout_end( )
```

This is an MPI code illustration. Alternatively pragma functionality may be provided in an OpenMP illustration set out below:

```
#pragma mpex_itimeout time( ) [mpi_op( )] mpi_comm( )
mpi_request( )
{
   /* Timeout Region (a structured block). */
}
```

A Fortran MPI may include procedures corresponding to the C/C++ functions in MPI as set out below.

```
call MPEX_ITIMEOUT(duration, min_max_time, min_max,
num_early_completion, comm., request)
   ! Timeout Region.
   call MPEX_ITIMEOUT_END
```

The Timeout Region is out-lined so that it can be executed and aborted when desired. A number of implementation possibilities are possible depending on the flexibility required. These are set out below.

| Flexibility Required | Restrictions and Implementation |
|---|---|
| (1) Memory allocation not permitted in region and no function calls permitted in region | The user must ensure execution may stop at any point within the region and should only rely on variables (e.g. timers) outside the region. With this restriction, the compiler supporting the time-out Region will outline the region. When the system reaches the Timeout Region during execution, the outlined code is called and the system may safely abort at any point within the Timeout Region, perform the minimal recovery of cleaning up after an early return from a function call, and resume immediately after the Timeout Region. |
| (2) Memory allocation allowed in region but no function calls permitted in region | The user must ensure execution may stop at any point within the region and can rely on variables outside the region. The user may also rely on memory successfully allocated in the region being deallocated on leaving the region. The implementation is as for (1) except a record is made of the allocated memory so that it is deallocated if necessary due to an early time-out. |
| (3) Memory allocation allowed in region but at most one level of function calls permitted in region | The restrictions on the user and guarantees given to the user are as for (2). All memory allocations resulting from child function calls of the time-out region are recorded so that deallocation is performed, if necessary, after an early time-out. |
| (4) Memory allocation allowed in region and an arbitrary number of function calls allowed in region | The restrictions and implementation are the same as for (3) except with a linked list or other suitable data structure used for recording memory allocations performed within child functions of the time-out region. The compiler must ensure that the child function calls of the time-out region carry out the correct recording and cleaning up regardless of whether these functions are called from within the Timeout Region or from a non-Timeout Region of the program. |

The Timeout Region is run on each supercomputer node until a total of "num_early_completion" processes have completed or until "duration" seconds has elapsed. If "duration" seconds elapse on a node, the time-out region is completed by aborting execution of the region. It is the programmer's responsibility to ensure that the computation can recover from the abort of the time-out region.

After the Timeout Region has finished executing on all nodes, "min_max_time" will point to either a double (specifying either the minimum or maximum time of completion depending on "min_max") or an array of two doubles (for an appropriate choice of "min_max").

The hardware time-out functionality, referred to herein in these specific examples as the Timeout Interface, can be built into the node. It may be similar to a Barrier Interface but allow for completion with a subset of the nodes completing the Timeout Region. This ensures a rapid cessation of execution of the Timeout Region without requiring inefficient MPI Cancel calls in high-level software. The Timeout Interface communicates directly with the attached CPU to cause a hardware-supported abort so that all instructions belonging to the Timeout Region are removed from the pipeline leaving other instructions unaffected and leaving the state of the CPU ready to continue computation from after the Timeout Region. Some differences between the prior art and the invention are clarified in FIG. 6 and the three different ways a time-out may occur are shown in FIG. 7.

Figure 6:
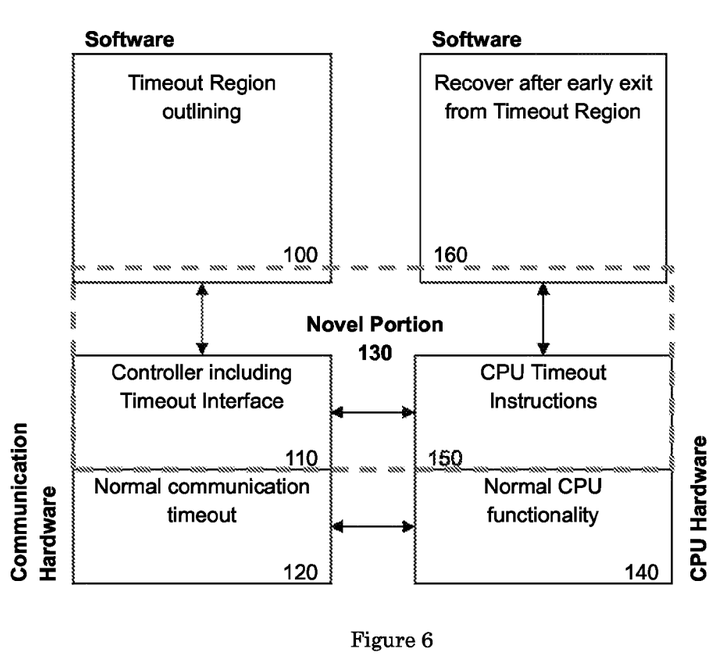
FIG. 6 is a block diagram illustrating the interaction of different components for technical implementation of invention embodiments.

FIG. 6 is a block diagram of arbitrary layout showing the interaction of different components of the apparatus required for implementation of an invention embodiment. A novel portion is highlighted in order to clarify one difference over the related art. As before, the diagram refers to a specific implementation but is generally applicable to any weak hardware barrier and time-out instructions.

FIG. 6 shows time-out region outlining 100 and its link to the execution of the Timeout Interface 110. A normal communication time-out is included as 120 and linked to normal CPU functionality 140. Timeout Interface execution 110 on the other hand is linked to the CPU time-out instructions 150. In turn these are linked to a recovery 160 after an early exit from the time-out region. It is assumed that concepts of outlining and recovery in general are known, so the portion of the diagram 130 indicated as particularly novel is the execution using the Timeout Interface and the CPU Timeout Instructions.

Figure 7:
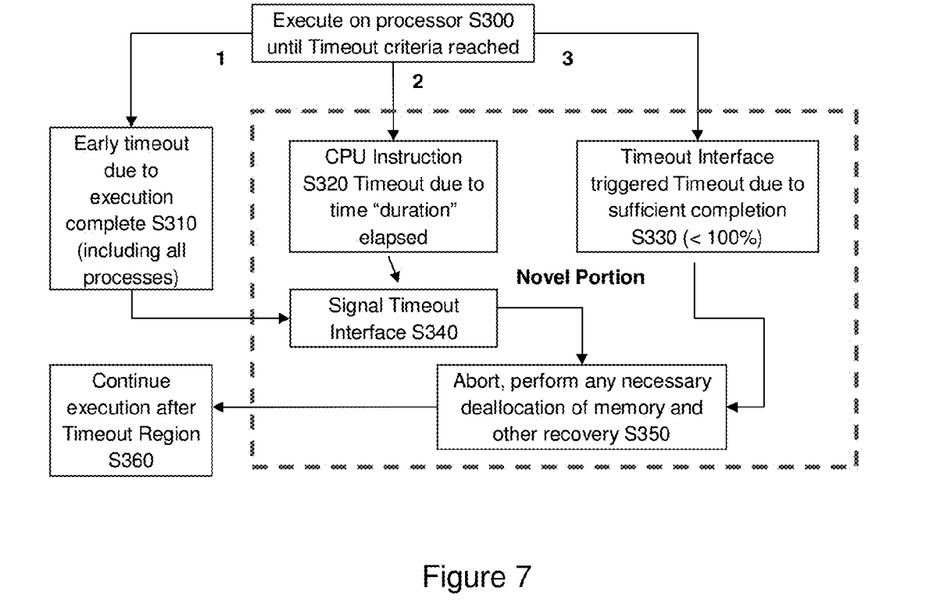
FIG. 7 is a flow diagram showing three different ways in which a time-out can occur.

FIG. 7 is a flow diagram showing three different ways a time-out may occur during execution on a processor. In step S300 execution of a processor continues until a time-out criterion is reached. There are three different time-out criteria, each with its own path. Path 1 is early time-out due to execution complete in step S310. This can include the case of sufficient completion being all processes (the predefined percentage is 100%). If execution completes on all the processes before the Time-out time limit has elapsed, any special procedure for aborting the region will be unnecessary and user-developer deallocations will have been performed. Essentially the abort and deallocation process will not differ greatly from the related art in this case except that some correct additional deallocations may occur which prevents some cases of memory leaks. At the point when memory is allocated, it is also registered for deallocation when leaving the time-out region. This is because one must be ready to terminate the time-out region at any point. The deallocations may have been incorrect previously, because the user-developer may have accidentally omitted a deallocation. Path 3, starting with step S330, shows the Timeout Interface being triggered due to sufficient completion. This may exclude the case when sufficient completion is specified as all processes (100%). In path 2, there is a CPU instruction time-out due to time duration elapsed in step S320. In an alternative, the Timeout Interface may itself include timing functionality. Paths 1 and 2 lead to signaling of a Timeout Interface in step S340 which is omitted in path 3 (when the Timeout Interface has already been triggered time-out in step S350 due to sufficient completion). Thus step S340 and step S330 both lead to step S350 of abort and any necessary de-allocation of memory and other such recovery. The process continues execution after the time-out region in step S360.

Figure 8:
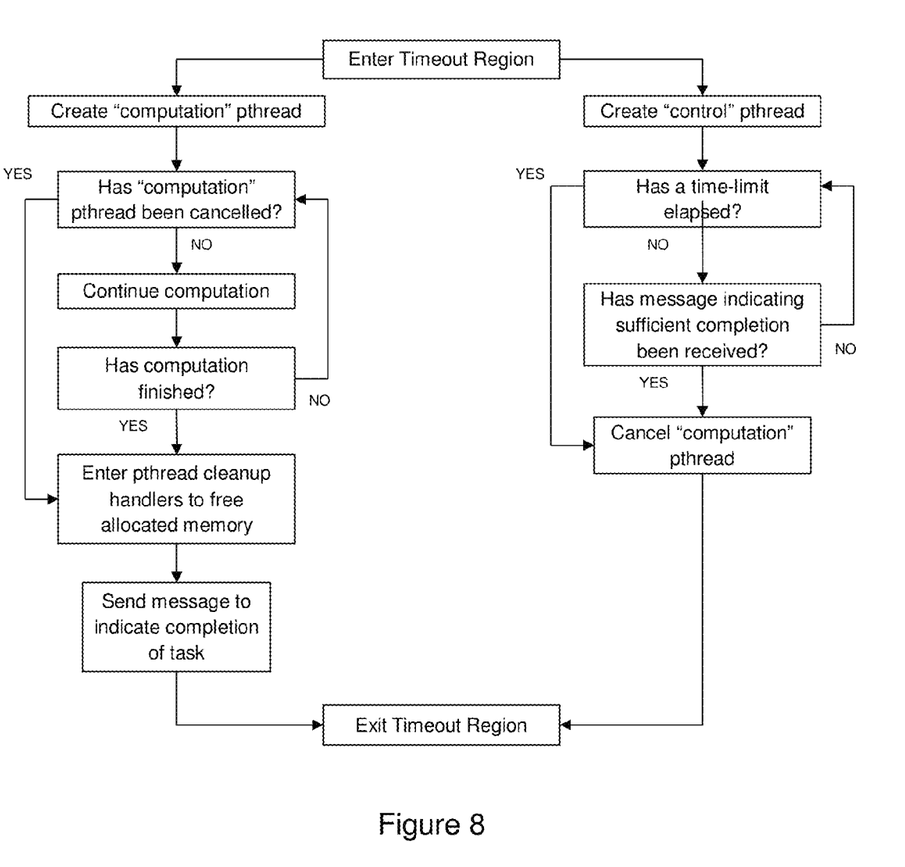
FIG. 8 is a flowchart used purely for illustrative purposes to describe a software implementation of a time-out region.

FIG. 8 is a flowchart describing a software only implementation of a time-out region, for illustration purposes only. The user's computation is out-lined into a "computation" pthread, and a "control" pthread is created which will cancel the "computation" pthread under certain conditions. The memory allocation functions malloc, realloc and free are replaced, for example using the GNU glibc hooks http://www.gnu.org/software/libc/manual/html_node/Hooks-for-Malloc.html, so that the allocation of memory results in calls to pthread_cleanup_push and memory is appropriately freed if the "computation" pthread is cancelled.

In order to implement the invention, hardware events must be able to change the behavior of an executing program and this can be done in a number of ways. A simple implementation will have equivalents to the "computation" and "control" threads as shown in FIG. 8 and a prearranged message delivered to indicate when sufficiently many trials have completed.

The primary benefit of having hardware support in invention embodiments is to reduce latency as compared to software polling for messages and such a latency benefit is illustrated in the previous reference on slide 15 which shows two alternative notification schemes both using Interconnect hardware support (the software equivalent would occupy more cycles on the CPU and give even greater latency).

From a technical perspective the main distinction over a standard hardware barrier is the necessity to keep track of the state of the processes/threads and carry out the necessary "housekeeping" on threads which have not arrived at the barrier when it exits. The person skilled in the art will appreciate that there may be different detailed implementations of the weak barrier, for example using a combination of interrupt handlers, signal handlers, exceptions and functionality such as setjmp/longjmp.

FIG. 8 suggests that in the software implementation the computational thread would have code inserted to periodically check whether it has been cancelled. In another implementation the computational thread proceeds as-is and the control thread sends a signal/exception/interrupt to the computation thread which then cleans up and exits.

SUMMARY OF THE POTENTIAL
ADVANTAGES OF INVENTION
EMBODIMENTS

1. Invention embodiments increase the efficiency of the auto-tuning phase of an application with the end result that an application is optimized in a shorter period of time as compared to prior art approaches to auto-tuning.
2. Invention embodiments can give hardware-based distributed support to the user during auto-tuning and optimization.
3. Invention embodiments can give hierarchical (whole-supercomputer and local-node) hardware-based support to the user during auto-tuning and optimization.
4. Invention embodiments can provide a programming model allowing easy programming. That is, the strategies for coding an API set out earlier show a realistic way of accessing the functionalities provided by the invention. These strategies are familiar to current programmers (in contrast with unfamiliar programming of FPGAs and GPGPUs).
5. Invention embodiments can address many different levels of the computational system apparatus. Examples include compile-time software level, time-out at the CPU hardware level, time-out at the routing element level (on the same chip as the CPU on a different chip but the same circuit board) and recovery of computation at the run-time software level.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A method of testing implementation parameters of a computer program in a distributed environment, the method comprising: testing of alternative implementation parameters in parallel in the distributed environment, and providing a time-out mechanism that
    checks for abort conditions including:
    a time allowed for testing has expired, and
    testing processes for a predefined amount of alternative implementations are complete, and
    that aborts testing processes when at least one of the abort conditions is satisfied;
    wherein the time out mechanism includes a hardware interface, which is arranged to cause a hardware supported abort and a software timeout region which is executed in the distributed environment until an abort condition is satisfied, an executable calling the hardware interface when the abort condition is satisfied; and
    wherein when the executable calls the hardware interface, the time-out mechanism removes instructions related to the time-out region from an instruction pipeline.

2. A method according to claim 1, wherein the software time-out region is an application programming interface written within source code of the computer program.

3. A method according to claim 2, wherein the software time-out region is designed to allow recovery after the testing processes have aborted, allowing subsequent parallel testing processes to take place.

4. A method according to claim 3, wherein the software time-out region returns values for one of minimum and maximum completion time of all completed parallel testing processes.

5. A method according to claim 4,
    wherein the distributed environment includes a plurality of cores and the testing is carried out in parallel on the plurality of cores, and
    wherein the cores are grouped together into nodes of the distributed environment.

6. A method according to claim 5, wherein the hardware interface is included in a controller of each node of the distributed environment.

7. A method according to claim 1, wherein the time-out mechanism sends a start instruction to mark a beginning of one of the time-out region and a time-out instruction to cause the abort.

8. A method according to claim 7, wherein the time-out mechanism aborts testing when a predefined percentage of alternative implementations has been fully processed and a time allowed for the testing has not expired.

9. A method according to claim 8, wherein a time allowed for testing is designed to allow completion of processes corresponding to faster alternative implementation parameters only.

10. A non-transitory computer-readable storage medium storing a computer program in the form of an application programming interface (API) for testing implementation parameters of a computer program in a distributed environment, the API implementing a time-out mechanism aborting parallel testing of alternative implementation parameters in the distributed environment when at least one of plural abort conditions is satisfied, the abort conditions including:

a time allowed for testing has expired, and testing processes for a predefined amount of alternative implementations are complete, wherein the API is a software timeout region which is executed in the distributed environment until an abort condition is satisfied, an executable calling the hardware interface when the abort condition is satisfied, the hardware interface being arranged to cause a hardware supported abort;

and wherein when the executable calls the hardware interface, the API removes instructions related to the time-out region from an instruction pipeline.

11. A controller of a node in a distributed environment of computing nodes, each node comprising a plurality of cores, the controller including:

a hardware interface arranged for use in a method of testing implementation parameters of a computer program in the distributed environment and a software timeout region which is executed in the distributed environment until an abort condition is satisfied, an executable calling the hardware interface when the abort condition is satisfied, the method comprising parallel testing of alternative implementation parameters in the distributed environment, wherein the hardware interface is arranged to abort the testing when at least one of plural abort conditions is satisfied, the abort conditions including:

a time allowed for testing has expired; and testing processes for a predefined amount of alternative implementations are complete;

and wherein when the executable calls the hardware interface, the time-out mechanism removes instructions related to the time-out region from an instruction pipeline.

12. A distributed computing environment comprising a plurality of nodes, each node including a controller according to claim 11.

13. A method of testing implementation parameters of a computer program in a distributed environment, the method comprising: testing of alternative implementation parameters in parallel in the distributed environment, and providing a time-out mechanism that checks for abort conditions including:

a time allowed for testing has expired, and testing processes for a predefined amount of alternative implementations are complete; and that aborts testing processes when at least one of the abort conditions is satisfied;

wherein the time out mechanism includes a hardware interface, which is arranged to cause a hardware supported abort and a software timeout region which is executed in the distributed environment until an abort condition is satisfied, an executable calling the hardware interface when the abort condition is satisfied;

wherein the software time-out region is an application programming interface written within source code of the computer program;

wherein the software time-out region is designed to allow recovery after the testing processes have aborted, allowing subsequent parallel testing processes to take place;

and wherein the software time-out region returns values for one of minimum and maximum completion time of all completed parallel testing processes.

* * * * *